Figure 1:
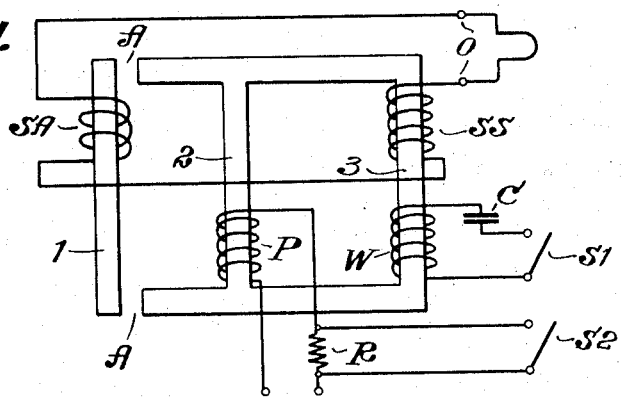

Feb. 1, 1944.   R. H. BURDICK   2,340,791
ELECTRIC POWER CONTRL CIRCUIT
Filed July 19, 1941   2 Sheets-Sheet 1

INVENTOR
Robert Harry Burdick
BY
ATTORNEY

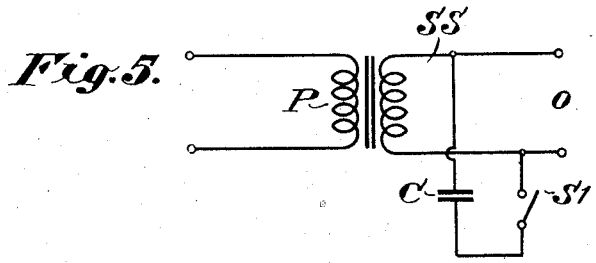
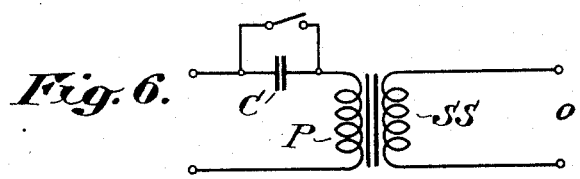
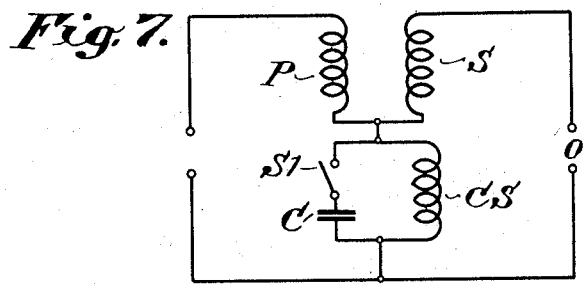
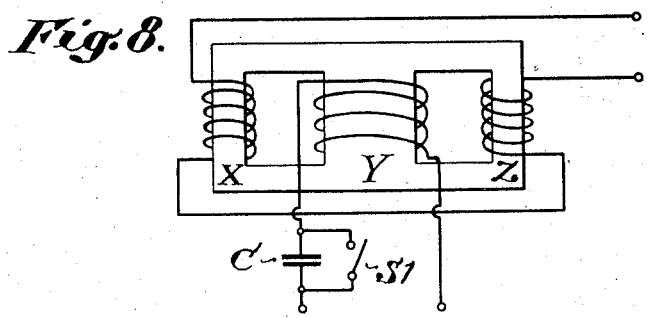

Patented Feb. 1, 1944

2,340,791

UNITED STATES PATENT OFFICE 2,340,791

ELECTRIC POWER CONTROL CIRCUIT

Robert Harry Burdick, Chelmsford, England, assignor to Radio Corporation of America, a corporation of Delaware Application July 19, 1941, Serial No. 403,245
In Great Britain May 28, 1940

6 Claims. (Cl. 171—119)

This invention relates to power control circuit arrangements and particularly to filament heating arrangements for high power valves.

An object of this invention is to provide an improved power control circuit which permits rapid starting from a stand-by condition of a radio transmitter.

Another object of this invention is to eliminate a large rush of power in the filament heating circuit upon starting up a radio transmitter.

According to the invention, a power control circuit arrangement includes a saturated transformer having at least one secondary winding and a primary winding, capacity means associated with the secondary winding, and switching means for connecting said capacity means effectively in parallel with said secondary winding. Alternatively the capacity means may be associated with the primary winding and the switching means may serve for connecting the capacity means effectively in series with the primary winding.

In some cases the saturated transformer may have two secondary windings, the secondary windings being separately wound on different limbs of a magnetic core in series-opposition and the magnetic circuits for the two secondary windings having different saturation characteristics, the capacity means being associated with the secondary winding on the magnetic circuit of highest saturation characteristic or with the primary winding and the switching means serving to connect said capacity means effectively in parallel with the last mentioned secondary winding or in series with the primary winding.

In a modification there may be two parallel connected primary windings and two series connected secondary windings one primary winding and one secondary winding being associated with a low saturation magnetic circuit and the other primary winding and the other secondary winding being associated with a high saturation magnetic circuit, the secondary winding means serving to connect the capacity means effectively in series with the last mentioned primary winding, or in parallel with the last.

In a further modification, the transformer may have only one primary winding and one secondary winding wound on a core of low saturation characteristic, a choke of high saturation characteristic being connected in series with the primary and secondary and the coil of said choke having capacity means associated with it, switching means being provided for connecting said capacity means effectively in parallel with the said choke.

If desired there may be included in the circuit of the primary winding a resistance, or, alternatively, the primary winding may comprise more turns than will be required after final heating conditions shall have been established, switching means being provided whereby the resistance may be short circuited or whereby the number of turns of the primary winding may be reduced.

Figure 2:
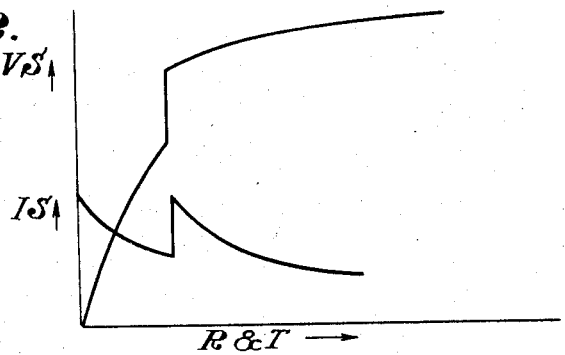
Figure 3:
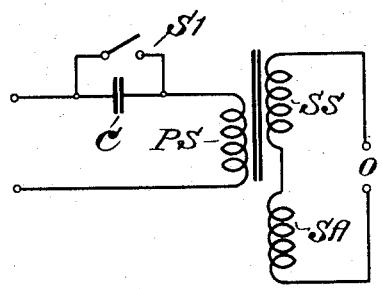
Figure 4:
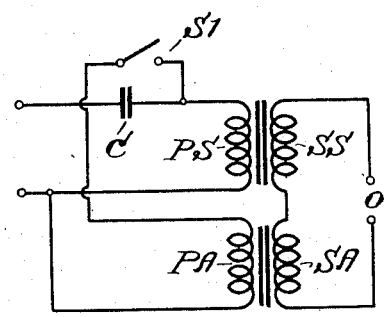

The invention is illustrated in and explained in connection with the accompanying drawings in which Fig. 1 shows a three limb magnetic transformer core and circuit, Fig. 2 is a curve of the power change relationship with time, Fig. 3 is a modification of the circuit shown by Fig. 1, Fig. 4 is a circuit arrangement of a high saturated transformer and a low saturated transformer, Fig. 5 is a circuit arrangement of a transformer and a condenser in parallel with the secondary winding, Fig. 6 is a circuit arrangement of a transformer and a condenser in parallel with the primary winding, Fig. 7 is a circuit arrangement of a transformer, a choke coil and a condenser, Fig. 8 is a transformer core and circuit arrangement wherein the primary winding is located on the center limb.

In one arrangement in accordance with the invention illustrated in Figure 1, a three-limb magnetic core comprises limbs 1, 2, and 3 an airgap A being provided between cores 1 and 2. A secondary winding SA is wound on limb 1, a secondary winding SS is wound on limb 3, and a primary winding P is wound on limb 2. The two secondary windings are connected to be in series-opposition. Limb 3 also carries a second or auxiliary winding W one terminal of which is connected to one terminal of a condenser C and the other terminals of the winding and condenser are connected to the two terminals of a switch S1. A resistance R is connected in one lead to the primary winding and a further switch S2 is connected across the resistance. The filament to be heated is connected to the output terminals O and a source of power is connected for application to the input terminals.

In the case of the larger valves where the magnitude of the starting current is limited to 150% of the normal value, the leakage reactance of the transformer, without the condenser switched in, is extremely high and may be designed to provide the 150% limitation above referred to, and after a few seconds the condenser is switched in to complete the starting conditions.

Figure 2 illustrates the relationship between load resistance and time (as abscissa) and current IS in and voltage VS across winding SS and SA (as ordinates). The sudden changes in these characteristics occur at the time that condenser C is switched in.

The resistance R is employed for the largest types of valve and may be short circuited after completion of the starting operation.

The arrangement permits of rapid starting from a stand-by condition, as is apparent from Figure 2, in which the voltage is required to be reduced when the valve is not in use, the stand-by condition being brought about by opening switch SI whereby the voltage across terminals O is reduced to about 60% of its previous value.

In a modification of the arrangement described in connection with Figure 1, and illustrated in Figure 3 in purely diagrammatic form, the condenser C is connected in series with the primary winding P of the saturated transformer, and switch SI is connected across the condenser. The two secondary windings SS and SA correspond with the corresponding windings in Figure 1, and as, in that figure, O is the output.

In the arrangement illustrated in Figure 4 a saturated transformer and a normal low-saturation transformer are used. The high saturation transformer comprises primary winding PS and secondary winding SS, and the low saturation transformer comprises primary winding PA and secondary winding SA. References C, SI, and O have the same signification as in Figures 1 and 2.

It will be appreciated that the unsaturated winding, wound in series opposition to the saturated winding improves the flatness of the characteristic V/I curve of the saturated transformer. As is well known whilst the voltage at the terminals of the saturated transformer is approximately constant as the current is increased, it actually rises at a more or less uniform rate. By opposing a winding in which the rise in voltage is proportional to the current the overall voltage of the combination may be made nearly constant. It has been found, however, that, in certain circuits, the characteristic curve of a saturated transformer is sufficiently flat without the necessity of providing an unsaturated secondary winding.

Figure 5 shows a circuit arrangement of this nature wherein the condenser C is arranged for connection, by switch SI, in parallel with winding SS and Figures 6 and 8 show a similar circuit arrangement wherein condenser C is arranged for connection, by switch SI, in series with the primary winding P.

Figure 7 illustrates an arrangement in which a normal, low saturation transformer is employed. This transformer has a primary winding P and a secondary winding S one terminal of each winding being connected together and to one terminal of a saturated choke CS. The free end of the saturated choke is connected in common to an input and an output terminal, the free end of winding P being connected to the other input terminal and the free end of winding S being connected to the other output terminal. Associated with choke CS is a condenser C and switch means SI.

Fig. 8 shows a transformer arrangement in which the secondary winding is wound partly on one and partly on the other of the two outer limbs X and Z. One of the limbs X and the limb Y on which the primary winding is wound are saturated. The condenser C is connected in series with one side of the primary winding and a switch SI is connected in parallel with condenser C. As mentioned above, the circuit arrangement for Fig. 8 is similar to that shown in Fig. 6.

The invention is susceptible of modification. Thus the condenser C may, in addition to being associated with switch SI so as to be switched in or out, be made variable or may consist of a plurality of condensers which may be switched in, in a time sequence. Such an arrangement is advantageous for certain types of valves. Moreover, there may be provided resistance elements or inductance elements, or series resistance and inductance elements, and switching means for connecting these elements in series with the capacity means.

Having now particularly described and ascertained the nature of our said invention and in what manner the same is to be performed I declare that what I claim is:

1. An electric power control circuit comprising a multi-limb magnetic core, a primary winding wound upon one of said limbs, a secondary winding which is divided into two portions, each one of said portions being wound on at least two other limbs of said core and connected to be in series opposition, an auxiliary winding located upon one of the limbs of said core upon which a portion of said secondary winding is located, and a condenser and a switch connected in series with said auxiliary winding.

2. An electric power control circuit comprising a three-limb magnetic core, a primary winding wound upon one of said limbs, a secondary winding which is divided into two portions, each one of said portions being wound upon the other two limbs of said core and connected to be in series opposition, an auxiliary winding located upon one of the limbs of the said core upon which a portion of said secondary winding is located, a condenser connected to one side of said auxiliary winding, and a switch connected to said condenser and the other side of said auxiliary winding to complete in a time sequence the circuit between said condenser and said auxiliary winding.

3. An electric power control circuit comprising a three-limb magnetic core which is divided into two parts with an air gap therebetween, a primary winding wound upon one of said limbs, a secondary winding which is divided into two portions, each one of said portions being wound upon the other two limbs of said core and connected to be in series opposition, an auxiliary winding located upon one of the limbs of the said core upon which a portion of said secondary winding is located, a condenser connected to one side of said auxiliary winding, and a switch connected to said condenser and the other side of said auxiliary winding to complete in a time sequence the circuit between said condenser and said auxiliary winding.

4. An electric power control circuit comprising a saturated transformer having a primary winding and two secondary windings connected to be in series opposition, an auxiliary winding located adjacent one of said windings, a condenser connected to one side of said auxiliary winding, and a switch connected in series with said auxiliary winding and said condenser.

5. An electric power control circuit comprising a multi-limb magnetic core, a primary winding wound upon one of said limbs, a secondary winding which is divided into two portions, each one of said portions being wound on at least two other limbs of said core and connected to be in series opposition, an auxiliary winding located upon one of the limbs of said core upon which a portion of said secondary winding is located, a condenser and a switch connected in series with said auxiliary winding, a resistance in series with said primary winding, and a switch connected in parallel with said resistance.

6. An electric power control circuit comprising a transformer having a magnetic core which is divided into two portions, one portion of said core having a high saturation characteristic, the other portion of said core having a low saturation characteristic, a primary winding located on the portion of said core which has a high saturation characteristic, a secondary winding, said secondary winding being divided into two portions, one portion of said secondary winding being located on the portion of said core having a high saturation characteristic, the other portion of said secondary winding being located on the portion of said core having a low saturation characteristic, both portions of said secondary windings being connected to be in series opposition, an auxiliary winding located adjacent one portion of the secondary winding which is located on the portion of the core having a high saturation characteristic and a condenser and a switch connected in series with said auxiliary winding, said switch serving to switch in said condenser in a time sequence.

ROBERT HARRY BURDICK.